United States Patent [19]
Phillips et al.

[11] Patent Number: 5,546,353
[45] Date of Patent: Aug. 13, 1996

[54] PARTITIONED DECODE CIRCUIT FOR LOW POWER OPERATION

[75] Inventors: Christopher E. Phillips, San Jose; Narendra Sankar, Sunnyvale, both of Calif.

[73] Assignee: National Semiconductor Corporation, Del.

[21] Appl. No.: 450,153

[22] Filed: May 26, 1995

[51] Int. Cl.$^6$ ..................................................... G11C 8/00
[52] U.S. Cl. ............... 365/230.06; 365/203; 365/230.08
[58] Field of Search ........................... 365/230.06, 203, 365/204, 230.08; 326/106

[56] References Cited

U.S. PATENT DOCUMENTS

| | | | |
|---|---|---|---|
| 5,189,319 | 2/1993 | Fung et al. | 307/452 |
| 5,204,953 | 4/1993 | Dixit | 395/400 |
| 5,235,545 | 8/1993 | McLaury | 365/230.06 X |
| 5,254,888 | 10/1993 | Lee et al. | 307/480 |
| 5,259,006 | 11/1993 | Price et al. | 375/107 |
| 5,295,106 | 3/1994 | Jinbo | 365/218 |
| 5,365,479 | 11/1994 | Hoang et al. | 365/230.06 |
| 5,394,373 | 2/1995 | Kawamoto | 365/230.06 |
| 5,404,473 | 4/1995 | Papworth et al. | 395/375 |
| 5,408,626 | 4/1995 | Dixit | 395/400 |

OTHER PUBLICATIONS

Masakazu Shoji, "Chapter 5: CMOS Dynamic Gates," AT&T CMOS Digital Circuit Technology, 1988, pp. 210–257.
Kane, Gerry, "R2000 Processor Programming Model", Chapter 2, *MIPS RISC Architecture*, MIPS Computer Systems, Inc.
Hennessy, John, et al., "Interpreting Memory Addresses", *Computer Architecture A Quantitative Approach*, pp. 95–97, Morgan Kaufmann Publishers, Inc. 1990.
*PowerPC601 Reference Manual*, IBM, 1994, Chapter 9, "System Interface Operation", pp. 9–15 thru 9–17.
Intel Corp., Microsoft Corp., *Advanced Power Management (APM) BIOS Interface Specification*, Revision 1.1, Sep. 1993.
Intel Corporation, *486 Micro Processor Hardware Reference Manual*, Processor Bus, pp. 3–28 thru 3–32.
Serra, Micaela & Dervisoglu, Bulent I, "Testing", Chapter 79, *The Electrical Engineering Handbook*, Richard C. Dorf, Editor–in–Chief, pp. 1808–1837, CRC Press.
L–T Wang et al., "Feedback Shift Registers For Self–Testing Circuits", *VLSI Systems Design*, Dec. 1986.
Masakazu Shoji, "CMOS Dynamic Gates", Chapter 5, *AT&T CMOS Digital Circuit Technology*, Prentice Hall, 1988, pp. 210–257.

(List continued on next page.)

*Primary Examiner*—David C. Nelms
*Assistant Examiner*—Son Dinh
*Attorney, Agent, or Firm*—Limbach & Limbach L.L.P.

[57] ABSTRACT

A partitioned decoder circuit responds to an address signal supplied at a decoder circuit input by providing a result data signal that corresponds to the address signal. Selection signal decoder circuitry asserts one or more of a plurality of decoder enable signals based upon the value of a decoder selection signal. A plurality of decoder circuit elements are each connected to receive a separate one of the asserted decoder enable signals. Each decoder circuit element includes a first clock input coupled to receive a precharge clock signal, an address input coupled to receive the address signal, address latching circuitry that latches the address signal in response to a polarity transition of the precharge clock signal, and a second clock input. Significantly, gated discharge clock signal generation circuitry of each decoder circuit element generates a gated discharge clock signal in response to the asserted decoder enable signal. The gated discharge clock signal is provided to the second clock input. A data output responds to the gated discharge clock signal being provided to the second clock input by providing an evaluation signal that corresponds to the latched address signal such that the result data signal includes the evaluation signal.

7 Claims, 1 Drawing Sheet

OTHER PUBLICATIONS

Guthrie, Charles, "Power–On Sequencing For Liquid Crystal Displays; Why, When, And How", *Sharp Application Notes,* Sharp Corporation, 1994, pp. 2–1 thru 2–9.

Bernd Moeschen, "NS32SP160—Feature Communication Controller Architecture Specification", *National Semiconductor,* Rev. 1.0, May 13, 1993.

Agarwal, Rakesh K., *80×86 Architecture and Programming, Vol. II: Architecture Reference,* Chapter 4, Prentice Hall, 1991, pp. 542–543.

Intel486 Microprocessor Family Programmer's Reference Manual, Intel Corporation, 1993.

"8237A High Performance Programmable DMA Controller (8237A, 8237A–4, 8237A–5)", *Peripheral Components,* Intel, 1992, pp. 3–14 thru 3–50.

5,546,353

PARTITIONED DECODE CIRCUIT FOR LOW POWER OPERATION

TECHNICAL FIELD OF THE INVENTION

The present invention relates to decoder circuits, and in particular, to a decoder circuit which is partitioned for power conservation.

BACKGROUND OF THE INVENTION

Conventional processor architectures include table-based control circuits for implementing processor "macro" instructions in microcode. Specifically, the microcode execution datapath is specified by a finite-state table-based control unit, implemented, for example, in a read only memory ("ROM") or Programmable Logic Array ("PLA"). The control unit, in response to a control input (e.g., a macroinstruction opcode), provides a state designation that tells the datapath what needs to be done to execute the "macro" instruction to which the control input corresponds.

Similarly, processor macroinstructions are typically stored in a ROM. A macroinstruction is provided from a data output of the ROM by strobing a read input concurrently with the ROM address of the macroinstruction being provided on an address bus.

With the quest for greater processor miniaturization, it is becoming necessary to further decrease the amount of power that processors consume. Thus, there is a need for table-based control circuits that can be optimized for lower-power consumption.

SUMMARY OF THE INVENTION

The present invention is a partitioned decoder circuit. The partitioned decoder circuit responds to an address signal supplied at a decoder circuit input by providing a result data signal that corresponds to the address signal. Selection signal decoder circuitry asserts one or more of a plurality of decoder enable signals based upon the value of a decoder selection signal. A plurality of decoder circuit elements are each connected to receive a separate one of the asserted decoder enable signals. Each decoder circuit element includes a first clock input coupled to receive a precharge clock signal, an address input coupled to receive the address signal, address latching circuitry that latches the address signal in response to a polarity transition of the precharge clock signal, and a second clock input.

Significantly, gated discharge clock signal generation circuitry of each decoder circuit element generates a gated discharge clock signal in response to the asserted decoder enable signal. The gated discharge clock signal is provided to the second clock input. A data output responds to the gated discharge clock signal being provided to the second clock input by providing an evaluation signal that corresponds to the latched address signal such that the result data signal includes the evaluation signal.

A better understanding of the features and advantages of the invention will be obtained by reference to the following detailed description and accompanying drawings which set forth an illustrative embodiment in which the principles of the invention are utilized.

DETAILED DESCRIPTION

Figure 1:
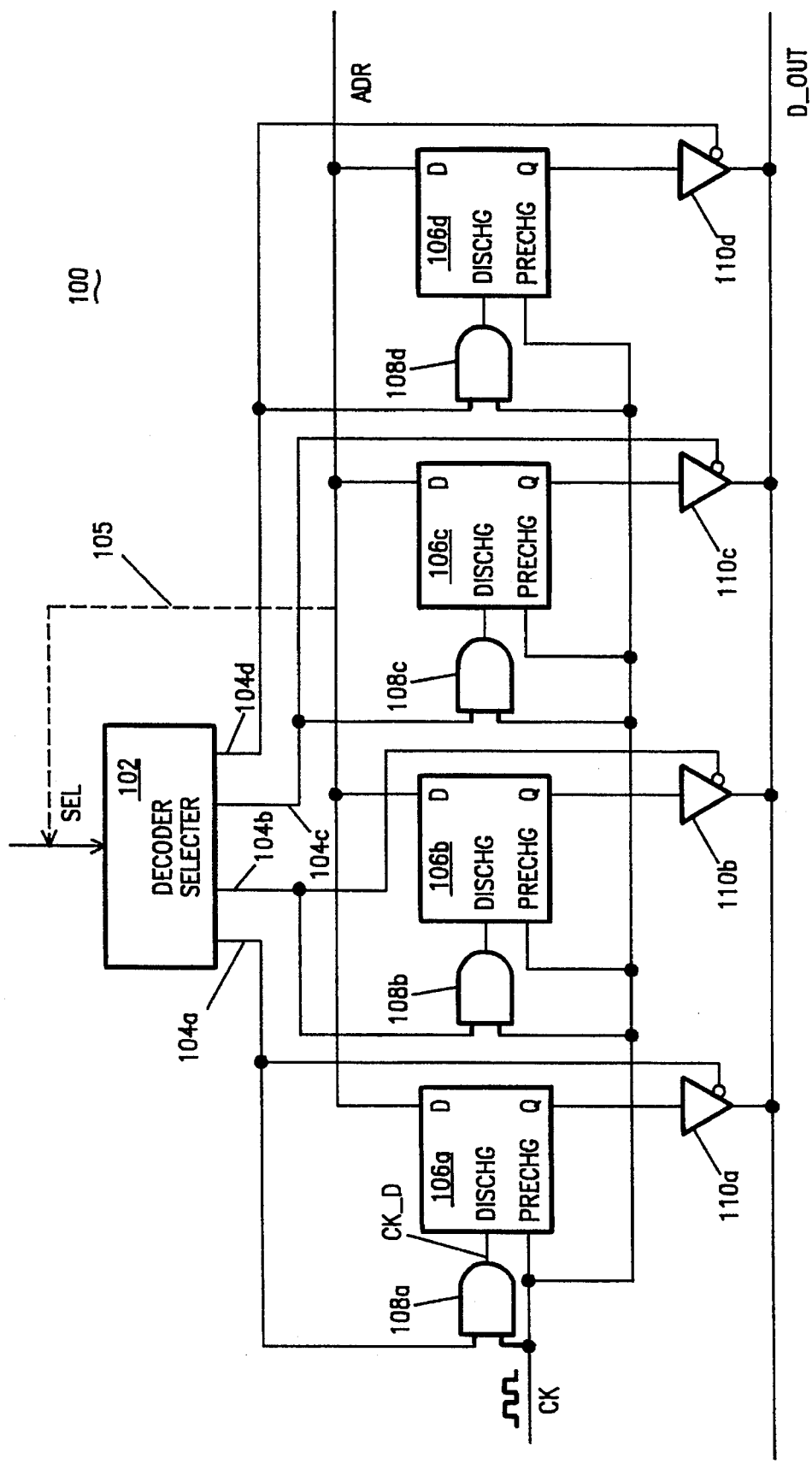
FIG. 1 schematically illustrates a partitioned decoder circuit in accordance with the present invention.

FIG. 1 shows a partitioned decoder circuit 100 in which a decoder selection signal SEL is provided to a decoder selector 102. The decoder selector 102 asserts those ones of four decoder enable signals 104a–104d indicated by the decoder selection signal SEL.

For example, if the decoder selection signal SEL is ostensibly be a processor macroinstruction opcode of a variable length instruction set, the decoder selector 102 could determine the "type" of the instruction from its length. As another example, the decoder selector 102 could determine the "type" as either floating point or fixed point. As yet another example, the "type" could be determined by the decoder selector 102 as one of reg/reg (for register to register data move instructions), reg/mem (for register to memory data move instructions), and mem/mem (for memory to memory data move instructions).

In any event, the decoder selector 102 asserts a decoder enable signal (one of 104a–104d) that corresponds to the determined instruction type. If the decoder selection signal SEL does not represent a valid instruction type, then none of the decoder enable signals 104a–104d are asserted. Circuitry suitable for implementation of decoder selector 102 is disclosed, for example, in commonly-assigned U.S. patent application Ser. No. 08/445,563, entitled "TAGGED PREFETCH AND INSTRUCTION DECODER FOR VARIABLE LENGTH INSTRUCTION SET AND METHOD OF OPERATION" (atty. docket no. NSC1-64100), filed on even date herewith and which is hereby incorporated by reference in its entirety.

As another example, the decoder selection signal SEL may represent an address, in a processor linear address space, of a macroinstruction to be fetched and decoded, with the decoder 102 being conventional address decoding logic circuitry. In this case, the decoder selector 102 asserts a decoder enable signal (one of 104a–104d) that corresponds to a block in the processor linear address space in which the macroinstruction resides.

As is discussed in detail below, the decoder enable signals 104a–104d function to selectively enable decoders 106a–106d, respectively, to provide a n evaluation signal at an output terminal Q. In particular, the decoders 104a–104d are circuits, such as a read-only memory ("ROM") or programmable logic array ("PLA") which latch an address signal ADR, presented to a data input D, in response to a clock signal CK provided to a "precharge" input, PRECHG. (In the case of the decoder circuit for providing macroinstructions from a ROM in a processor linear instruction space, the address signal ADR is the same signal as the select signal SEL provided to the decoder selector 102. This is shown by the dashed line 105 in FIG. 1.) The decoders 104a–104d provide the evaluation signal, corresponding to the latched address signal, to a data output Q in response to a clock signal CK_D provided to a "discharge" input, DISCHG. Examples of such circuits are well-known in the art and are discussed, for example, in Chapter 5 of *CMOS Digital Circuit Technology*, by Masakazu Shoji (Prentice Hall, 1988).

Referring still to FIG. 1, the clock signal CK is continuously provided to the "precharge" inputs of the decoders 106a–106d. However, a significant feature of the present invention is that the clock signals provided to the "discharge" inputs DISCHG of the decoders 106a–106d are "gated" by the decoder enable signals 104a–104d, respectively, via AND devices 108a–108d, respectively. Thus, only the required one or ones of decoders 106a–106d is discharged, with the result that the power consumed by the decoder circuitry as a whole is much less than the power that would otherwise be consumed if the clock signal CK_D provided to the "discharge" inputs DISCHG was not gated and, furthermore, if all of the decoding were provided in a single decoder circuit, discharged by a single clock.

In some applications of the present invention, more than one of the decoder enable signals 104a–104d may be asserted at any one time. That is, the decoder selection signal SEL may indicate more than one "type". However, in many other applications (e.g., decoding processor macroinstructions), only one (if any) of the decoder enable signals 104a–104d is asserted at any one time. Thus, in this case, at most one of the decoders 106a–106d is used at any one time, and at most one of the data outputs Q of the decoders 106a–106d need be enabled at any one time. Thus, as further shown in FIG. 1, in accordance with an embodiment of the present invention, the data outputs Q of the decoders 106a–106d are enabled to drive a data output bus D_OUT only in response to the decoder select signals 104a–104d, respectively. In particular, the data outputs Q of decoders 106a–106d drive the data output bus D_OUT via bus driver circuitry 110a–110d, respectively, which are enabled by decoder select signals 104a–104d, respectively.

As an example, referring still to FIG. 1, when decoder select signal 104a is not asserted, then bus driver circuit 110a presents a high impedance to data output bus D_OUT. When decoder select signal 104a is asserted, then data output Q of decoder 106a is allowed to drive the data output bus D_OUT, via bus driver circuit 110a.

While a particular embodiment of the invention has been described, it should be understood that various alternatives to the embodiment of the invention described herein may be employed in practicing the invention.

Moreover, the invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451,319, entitled "DISPLAY CONTROLLER CAPABLE OF ACCESSING AN EXTERNAL MEMORY FOR GRAY SCALE MODULATION DATA" (atty. docket no. NSC1-62700); U.S. patent application Ser. No. 08/451,965, entitled "SERIAL INTERFACE CAPABLE OF OPERATING IN TWO DIFFERENT SERIAL DATA TRANSFER MODES" (atty. docket no. NSC1-62800); U.S. patent application Ser. No. 08/453,076, entitled "HIGH PERFORMANCE MULTIFUNCTION DIRECT MEMORY ACCESS (DMA) CONTROLLER" (atty. docket no. NSC1-62900); U.S. patent application Ser. No. 08/452,001, entitled "OPEN DRAIN MULTI-SOURCE CLOCK GENERATOR HAVING MINIMUM PULSE WIDTH" (atty. docket no. NSC1-63000); U.S. patent application Ser. No. 08/451,503, entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION" (atty. docket no. NSC1-63100); U.S. patent application Ser. No. 08/451,924, entitled "EXECUTION UNIT ARCHITECTURE TO SUPPORT x86 INSTRUCTION SET AND x86 SEGMENTED ADDRESSING" (atty. docket no. NSC1-63300); U.S. patent application Ser. No. 08/451,444, entitled "BARREL SHIFTER" (atty. docket no. NSC1-63400); U.S. patent application Ser. No. 08/451,204, entitled "BIT SEARCHING THROUGH 8, 16, OR 32-BIT OPERANDS USING A 32-BIT DATA PATH" (atty. docket no. NSC1-63500); U.S. patent application Ser. No. 08/451,195, entitled "DOUBLE PRECISION (64-BIT) SHIFT OPERATIONS USING A 32-BIT DATA PATH" (atty. docket no. NSC1-63600); U.S. patent application Ser. No. 08/451,571, entitled "METHOD FOR PERFORMING SIGNED DIVISION" (atty. docket no. NSC1-63700); U.S. patent application Ser. No. 08/452,162, entitled "METHOD FOR PERFORMING ROTATE THROUGH CARRY USING A 32-BIT BARREL SHIFTER AND COUNTER" (atty. docket no. NSC1-63800); U.S. patent application Ser. No. 08/451,434, entitled "AREA AND TIME EFFICIENT FIELD EXTRACTION CIRCUIT" (atty. docket no. NSC1-63900); U.S. patent application Ser. No. 08/451,535, entitled "NON-ARITHMETICAL CIRCULAR BUFFER CELL AVAILABILITY STATUS INDICATOR CIRCUIT" (atty. docket no. NSC1-64000); U.S. patent application Ser. No. 08/445,563, entitled "TAGGED PREFETCH AND INSTRUCTION DECODER FOR VARIABLE LENGTH INSTRUCTION SET AND METHOD OF OPERATION" (atty. docket no. NSC1-64100); U.S. patent application Ser. No. 08/450,153, entitled "PARTITIONED DECODER CIRCUIT FOR LOW POWER OPERATION" (atty. docket no. NSC1-64200); U.S. patent application Ser. No. 08/451,495, entitled "CIRCUIT FOR DESIGNATING INSTRUCTION POINTERS FOR USE BY A PROCESSOR DECODER" (atty. docket no. NSC1-64300); U.S. patent application Ser. No. 08/451,219, entitled "CIRCUIT FOR GENERATING A DEMAND-BASED GATED CLOCK" (atty. docket no. NSC1-64500); U.S. patent application Ser. No. 08/451,214, entitled "INCREMENTOR/DECREMENTOR" (atty. docket no. NSC1-64700); U.S. patent application Ser. No. 08/451,150, entitled "A PIPELINED MICROPROCESSOR THAT PIPELINES MEMORY REQUESTS TO AN EXTERNAL MEMORY" (atty. docket no. NSC1-64800); U.S. patent application Ser. No. 08/451,198, entitled "CODE BREAKPOINT DECODER" (atty. docket no. NSC1-64900); U.S. patent application Ser. No. 08/445,569, entitled "TWO TIER PREFETCH BUFFER STRUCTURE AND METHOD WITH BYPASS" (atty. docket no. NSC1-65000); U.S. patent application Ser. No. 08/445,564, entitled "INSTRUCTION LIMIT CHECK FOR MICROPROCESSOR" (atty. docket no. NSC1-65100); U.S. patent application Ser. No. 08/452,306, entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE" (atty. docket no. NSC1-65200); U.S. patent application Ser. No. 08/452,080, entitled "APPARATUS AND METHOD FOR EFFICIENT COMPUTATION OF A 486™ MICROPROCESSOR COMPATIBLE POP INSTRUCTION" (atty. docket no. NSC1-65700); U.S. patent application Ser. No. 08/450,154, entitled "APPARATUS AND METHOD FOR EFFICIENTLY DETERMINING ADDRESSES FOR MISALIGNED DATA STORED IN MEMORY" (atty. docket no. NSC1-65800); U.S. patent application Ser. No. 08/451,142, entitled "METHOD OF IMPLEMENTING FAST 486™ MICROPROCESSOR COMPATIBLE STRING OPERATION" (atty. docket no. NSC1-65900); U.S. patent application Ser. No. 08/452,659, entitled "A PIPELINED MICROPROCESSOR THAT PREVENTS THE CACHE FROM BEING READ WHEN THE CONTENTS OF THE CACHE ARE INVALID" (atty. docket no. NSC1-66000); U.S. patent application Ser. No. 08/451,507, entitled "DRAM CONTROLLER THAT REDUCES THE TIME REQUIRED TO PROCESS MEMORY REQUESTS" (atty. docket no. NSC1-66300); U.S. patent application Ser. No. 08/451,420, entitled "INTEGRATED PRIMARY BUS AND SECONDARY BUS CONTROLLER WITH REDUCED PIN COUNT" (atty. docket no. NSC1-66400); U.S. patent application Ser. No. 08/452,366, entitled "SUPPLY AND INTERFACE CONFIGURABLE INPUT/OUTPUT BUFFER" (atty. docket no. NSC1-66500); U.S. patent application Ser. No. 08/451,744, entitled "CLOCK GENERATION CIRCUIT FOR A DISPLAY CONTROLLER HAVING A FINE TUNEABLE FRAME RATE" (atty. docket no. NSC1-66600); U.S. patent application Ser. No. 08/451,206, entitled "CONFIGURABLE POWER MANAGEMENT SCHEME" (atty. docket no. NSC1-66700); U.S. patent application Ser. No. 08/452,350, entitled "BIDIRECTIONAL PARALLEL SIGNAL INTERFACE" (atty. docket no. NSC1-67000); U.S. patent application Ser. No. 08/452,094, entitled "LIQUID CRYSTAL DISPLAY (LCD) PROTECTION CIRCUIT" (atty. docket no. NSC1-67100); U.S. patent application Ser. No. 08/450,158, entitled "DISPLAY CONTROLLER CAPABLE 0F ACCESSING GRAPHICS DATA FROM A SHARED SYSTEM MEMORY" (atty. docket no. NSC1-67500); U.S. patent application Ser. No. 08/450,726, entitled "INTEGRATED CIRCUIT WITH TEST SIGNAL BUSES AND TEST CONTROL CIRCUITS" (atty. docket no. NSC1-67600); U.S. patent application Ser. no. 08/445,568, entitled "DECODE BLOCK TEST METHOD AND APPARATUS" (atty. docket no. NSC1-68000).

It is intended that the following claims define the scope of the invention and that methods and apparatus within the scope of these claims and their equivalents be covered thereby.

What is claimed is:

1. A partitioned decoder circuit that provides, at a decoder circuit output, a result data signal corresponding to an address signal supplied at a decoder circuit input, the partitioned decoder circuit comprising:

selection signal decoder circuitry that asserts one or more of a plurality of decoder enable signals based upon the value of a decoder selection signal; and a plurality of decoder circuit elements, each decoder circuit element being connected to receive a separate one of the asserted decoder enable signals, each decoder circuit element including a first clock input coupled to receive a precharge clock signal, an address input coupled to receive the address signal;

address latching circuitry that latches the address signal in response to a polarity transition of the precharge clock signal, a second clock input;

gated discharge clock signal generation circuitry that generates a gated discharge clock signal in response to the asserted decoder enable signal and provides the gated discharge clock signal to the second clock input; and a data output that responds the gated discharge clock signal being provided to the second clock input by providing an evaluation signal that corresponds to the latched address signal such that the result data signal includes the evaluation signal.

2. A partitioned decoder circuit as in claim 1, wherein the address signal is the decoder selection signal.

3. A partitioned decoder circuit as in claim 1, and further including a data output bus, each of said plurality of decoder circuit elements further including a bus driver circuit element connecting the data output to the data output bus, said bus driver circuit element driving the evaluation signal onto the data output bus in response to the decoder enable signal received by the decoder circuit element being asserted.

4. A partitioned decoder circuit as in claim 3, wherein the bus driver circuit element presents a high impedance to the data output bus when the decoder enable signal is not asserted.

5. A partitioned decoder circuit as in claim 1, wherein the gated discharge clock generation circuitry comprises AND circuitry coupled to receive the precharge clock signal and the decoder enable signal as inputs and provides the precharge clock signal as the gated discharge clock signal when the decoder enable signal is asserted.

6. A partitioned decoder circuit as in claim 1, wherein at least one of the decoder circuit elements is a ROM.

7. A partitioned decoder circuit as in claim 1, wherein at least one of the decoder circuit elements is a PLA.

* * * * *